United States Patent [19]

Spanke

[11] Patent Number: 5,572,350
[45] Date of Patent: Nov. 5, 1996

[54] METHOD AND APPARATUS TO COMPENSATE FOR DIFFERENTIAL ATTENUATION IN AN OPTICAL TIME SLOT INTERCHANGER

[75] Inventor: Ronald A. Spanke, Wheaton, Ill.

[73] Assignee: Lucent Technologies Inc., Murray Hill, N.J.

[21] Appl. No.: 221,206

[22] Filed: Mar. 31, 1994

[51] Int. Cl.$^6$ ..................................... H04J 14/08
[52] U.S. Cl. .................. 359/140; 359/139; 359/161
[58] Field of Search .................. 370/66, 67, 68; 375/11; 359/138, 139, 140, 161, 194, 128, 127, 173

[56] References Cited

U.S. PATENT DOCUMENTS

| | | | |
|---|---|---|---|
| 4,128,759 | 12/1978 | Hunt et al. | 359/173 |
| 4,644,145 | 2/1987 | Gundner | 359/194 |
| 4,681,395 | 7/1987 | Lindsay et al. | 359/173 |
| 4,922,479 | 5/1990 | Su | 370/1 |
| 4,991,975 | 2/1991 | Alferness et al. | 370/4 |
| 5,103,333 | 4/1992 | Koai | 359/140 |
| 5,214,729 | 5/1993 | Koai | 385/27 |
| 5,276,543 | 1/1994 | Olshansky | 359/127 |

FOREIGN PATENT DOCUMENTS 0104433  5/1991  Japan ..................................... 359/194
0136529  6/1991  Japan ..................................... 359/194

OTHER PUBLICATIONS

R. A. Thompson et al., "An Experimental Photonic Time–Slot Interchanger Using Optical Fibers as Reentrant Delay–Line Memories", *Journal of Lightwave Technology*, vol. LT–5, No. 1, Jan. 1987, pp. 154–162.

R. A. Thompson, "Architectures with Improved Signal–to–Noise Ratio in Photonic Systems with Fiber–Loop Delay Lines", *IEEE Journal on Selected Areas in Communications*, vol. 6, No. 7, Aug. 1988, pp. 1096–1106.

Primary Examiner—Leo Boudreau
Assistant Examiner—Bhavesh Mehta
Attorney, Agent, or Firm—Jack R. Penrod

[57] ABSTRACT

Look-ahead control techniques and a variable attenuator are used to solve the known problem of differential attenuation of photonic intensities between time slots are delayed differently in delay paths that have different losses which optical time slot interchangers have. The result of the look-ahead control techniques and variable attenuator is a data frame in which the widely varying photonic intensities are equalized to a substantially similar level, thereby greatly reducing the bit error rate of the downstream receiver/demodulator.

12 Claims, 3 Drawing Sheets

METHOD AND APPARATUS TO COMPENSATE FOR DIFFERENTIAL ATTENUATION IN AN OPTICAL TIME SLOT INTERCHANGER

FIELD OF THE INVENTION

This invention relates to optical systems and more particularly to a method and apparatus for compensating for the different intensities of optical signals occupying adjacent time slots in data frame.

BACKGROUND OF THE INVENTION

In completely photonic systems, the only known way to store information carried by photonic signals, e.g. modulated light, is to direct the signal along an optical delay path which returns the signal to the desired output location after the delay required for the photonic signals to traverse the delay path. As the photonic signals travel along a passive optical delay path they typically become attenuated. Thus, if a group of photonic signals that have traversed a delay path are inserted into a data frame just before or just after a group of photonic signals that have not been delayed, there typically is a substantial difference between the intensities of the two photonic signal groups. FIG. 1 shows an optical slot interchange system that provides such delays and the problems of different photonic intensities within a resulting resulting data frame. Differences in intensity between photonic signal groups cause difficulties in demodulation and detection of the data carded by the signals because most optical demodulators operate best with inputs that have uniform intensity levels.

U.S. Pat. No. 5,214,729 issued May 25, 1993 to Kwang-Tsai Koai mentions the problem of differences of intensities and the detrimental effect which the problem has on system performance. As a solution, Koai suggests changing the splitting ratio of a passive input splitter and/or the combining ratio of the combiner within the optical time slot interchanger. Since the Koai patent considers passive splitters passive and combiners, these splitting ratios would be fixed to equalize all of the photonic intensity levels with the intensity of the longest delay path, even if that path is not used for the processing of a data frame. Technically, the combiners may be considered active instead of passive since they have amplifiers in series with them that have two states, block and amplify by a fixed dB amount. This off-or-amplify-by-a-fixed-amount characteristic does not change the fact that each path from combiner to output has a fixed attenuation. With this fixed system of Koai, some photonic signals will be attenuated more than the amount necessary to equalize the differences in their respective frame of optical data because the attenuations are selected to equalize the level the photonic intensities to that of the worst case delay. Because most frames will not need the worst case intensity equalizing, the signal to noise ratio of the system of Koai is virtually always lower than it could be if splitters and combiners with fixed attenuation were not used.

It is an object of the present invention to provide an apparatus that equalizes the photonic intensities of the optical data slots in each frame, such that all photonic intensities are equal to the intensity level of the most attenuated slot of the frame, whatever that level might be, thereby achieving the maximum signal to noise ratio possible for an equalized frame and improving the detectability of the frame by an optical detector.

It is an object of the present invention to provide an apparatus that attenuates each optical data slot by the minimum amount required to equalize the differences of photonic signal intensities within each frame of optical data.

It is another object of the present invention to provide a method for attenuating the intensity of each optical data slot by the minimum amount required for equalizing the differences of photonic intensities within each frame of optical data.

SUMMARY OF THE INVENTION

Briefly stated in accordance with one aspect of the invention the aforementioned objects are achieved by providing an apparatus that adjusts the photonic intensity of each optical data slot of a respective optical data frame after the slot leaves the optical time slot interchanger to the photonic intensity of the optical time slot that underwent the greatest amount of attenuation by the time slot interchanger. The latter slot would not be adjusted at all. Thus, the optical data frame would have time slots all with equal photonic intensities to provide the optimum demodulation and detection condition, and yet not reducing the intensity level lower than the level of the most attenuated time slot to provide the best signal to noise ratio.

In another aspect of the invention, the aforementioned objects are achieved by providing an optical apparatus which has a combiner with a plurality of inputs and an output. A first path for optical signals is connected to a first input of the combiner for delivering a first photonic signal. A second path for optical signals is connected to a second input of the combiner for delivering a second photonic signal. The first photonic signal, which has a first intensity, enters the first input of the combiner from the first path during a first period of time, and the second photonic signal, which has a second intensity, enters the second input of the combiner from the second path during a second period of time, which is adjacent to the first period of time. A third path for optical signals is connected to the combiner output. The combiner combines the photonic signals from its inputs into a single train of photonic signals which propagate along the third path. A controllable optical attenuator, which has an input and an output, has its input connected to the third path to receive said single train of photonic signals. Connected to the controllable optical attenuator is a controller for controlling the controllable optical attenuator to attenuate the first photonic signal intensity to substantially the same intensity as that of the second photonic signal intensity.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying figures in which:

DETAILED DESCRIPTION

Figure 1:
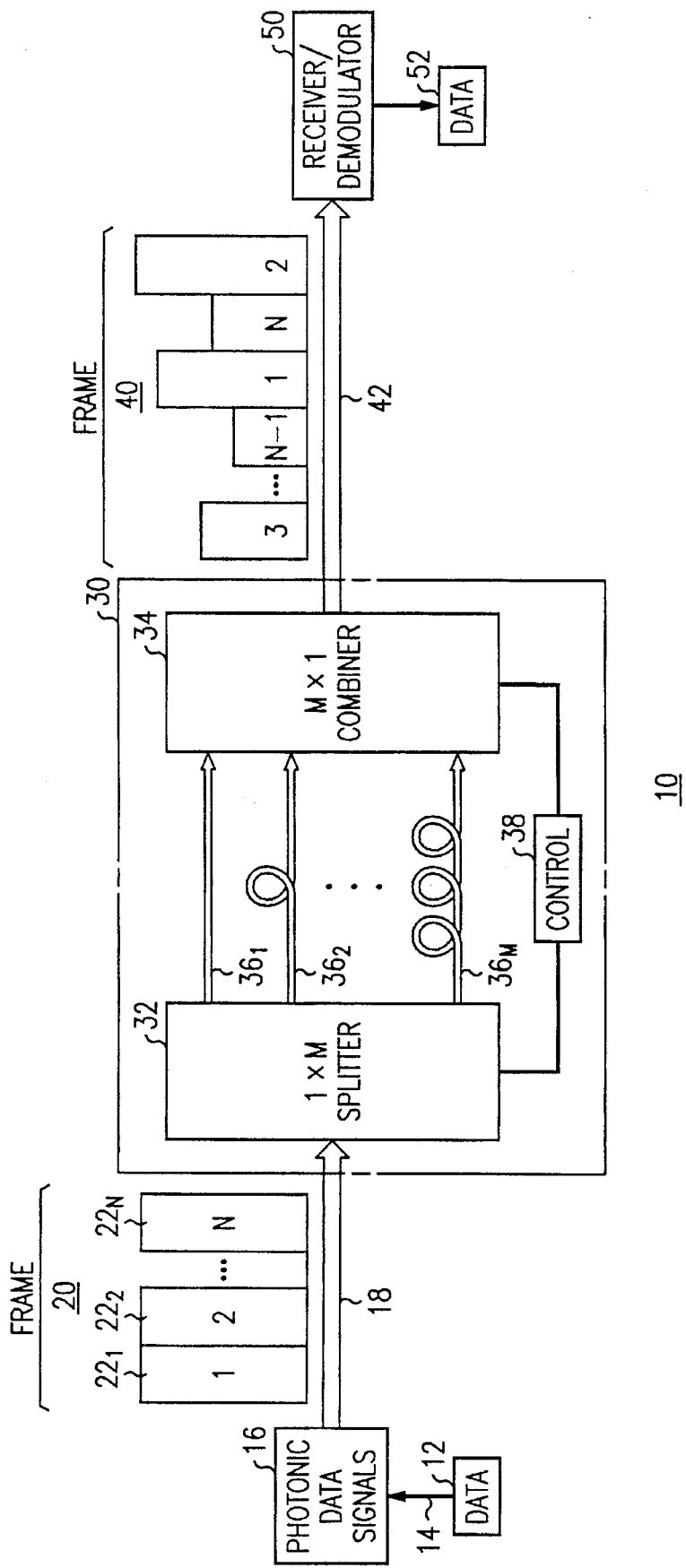
FIG. 1 is a block diagram illustrating an optical time slot interchanging system that does not equalize the differences of intensity between r-ordered slots.

FIG. 1, as mentioned above, shows an optical time slot interchange system 10 that does not have any equalizing of the photonic intensities. System 10 has a source of data 12, which is connected by link 14 to a source of photonic signals 16. The data from source 12 may be any type of information, analog or digital. Link 14 may be electrical or optical depending on the needs of the system 10. The source of photonic signals 16 could be any type of optical source, but a laser is preferred. The data from source 12 modulates the photonic signals which are emitted from source of photonic signals 16 along path 18. The type of modulation may be any type, but those types with relatively constant intensities are preferred over the types where the intensity amplitude variations bear the modulated data. An optical data frame 20 is shown as it would appear along optical path 18. For standard telephony purposes, optical data frame 20 would be 125 microseconds long; other applications could have longer or shorter frames. Optical data frame 20 has multiple time slots $22_1$–$22_N$ for transmitting N individual messages, or transmitting individual portions of a time division multiplexed message using strict time division multiplexing or the packet variation. All the slots $22_1$–$22_N$ have the same intensity at this point.

Path 18 is connected to an optical time slot interchanger (OTSI) 30. There are numerous ways to make the OTSI 30, the embodiment shown in FIG. 1 is similar to that used by Thompson in Architecture with Improved Signal-to-Noise Ratio in Photonic Systems with Fiber-Loop Delay Lines, IEEE Journal ON SELECTED AREAS OF COMMUNICATIONS, August, 1988, page 1096. OTSI 30 has a 1XM splitter 32 and a MX1 combiner 34 connected by delay paths $36_1$–$36_M$. To maintain frame integrity, the number of delay paths, M, must be equal to or greater than one less than twice the number of slots, i.e., M≧2N−1. A controller 38, which includes medium voltage driver circuits, controls the 1XM splitter 32 to switch the right slot to the right delay path for its desired time slot interchange. Similarly, controller 38 also controls combiner 34 to switch the right slot from the right delay path to be the output of the OTSI 30.

Optical data frame 40 shows how the intensities of the slots may be affected as time slots are interchanged. Frame 40 in FIG. 1 is a frame integrity maintaining example, but the invention is not limited to frame maintaining interchanges. In optical data frame 40, slot N has been delayed N−2 time slots and inserted after slot 2 which was delayed only by the shortest path from 1XM splitter 32 to MX1 combiner 34, hence, relatively no delay. Slot 1 has been delayed only one time slot and inserted after slot N. Slot N−1 has been delayed N time slots and inserted after slot 1. The remainder of the slots N−2 to 3 are inserted in descending order after slot N−1. The photonic intensities of slots N and N−1 are substantially less, because of the attenuation of the long delay paths to which they were switched, than the photonic intensities of slots 2 and 1 because of the minimal attenuation of their short delay paths. This re-ordered optical data frame has differential attenuation according to the amount of delay and any other attenuation cause in its selected path through the OTSI 30. The output of OTSI is transmitted along path 42 to receiver/demodulator 50.

Differential attenuation has a devastating effect on the receiver/demodulator 50. The receiver/demodulator 50 typically has an automatic gain control circuit which attempts to adjust the gain to the average intensity level of the received optical signal. When the average intensity of the received signal is high, the AGC circuit lowers its sensitivity. If, after lowering its sensitivity, the next time slot comes in with a lower power level, the 1's in the signal are not strong enough for the decision circuit in the receiver/demodulator 50 to decode as 1's and the entire time slot tends to be detected as all 0's. As the AGC circuit begins to ramp up toward the end of this time slot, the data begins to be properly decodable again. However, if the next time slot has a high photonic intensity level. This level saturates the receiver/demodulator 50 because of the high value of the AGC circuit. With the AGC circuit turned up, it begins to detect noise during the 0 bits as having a high enough photonic intensity to be interpreted as 1's by the decision circuit of the receiver/demodulator 50. A differential attenuation of only a few dB can completely destroy the bit error performance of the entire OTSI system 10 and make the demodulated data to data unit 52 useless.

Figure 2:
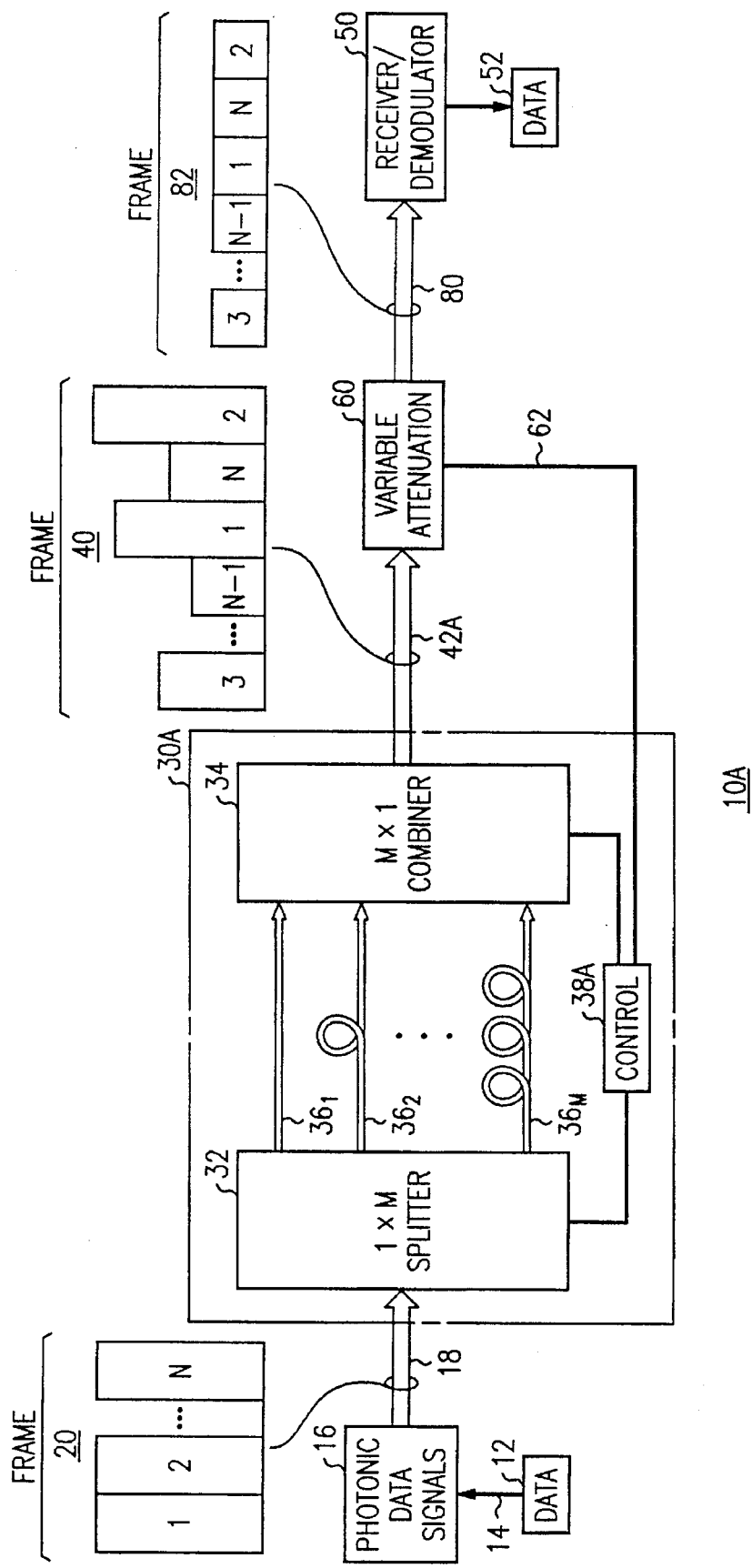
FIG. 2 is a block diagram illustrating an optical time slot interchanging system that equalizes the differences of intensity between re-ordered slots according to the invention.

Referring now to FIG. 2, an OTSI system 10A is shown according to one embodiment of the present invention. OTSI system 10A overcomes the differential attenuation problem of OTSI system 10 that is shown in FIG. 1. System 10A has the same source of data 12, link 14, source of photonic signals 16 and path 18 as OTSI system 10. Thus, System 10A has the same type of data frame 20 applied to its input to OTSI 30A as system 10 applies to its input to OTSI 30. After the input to OTSI 30A is where the improvements of the present invention begins.

OTSI 30A has the attenuation of each delay path $36_1$ to $36_M$ between 1XM splitter 32 and MX1 combiner 34 predetermined, for example by measurement at time of manufacture. The predetermined attenuations of the delay paths $36_1$ –$36_M$ are stored in controller 38A. These attenuations are used with the data frame re-ordering data to determine the time slot that is attenuated the most as it propagates through OTSI 30A and then determines, either by calculation, or look-up if the calculations have been worked out beforehand, the difference between the attenuation of the most attenuated time slot and the respective attenuation of each of the other time slots. Thus, inside the controller 38A the amount of attenuation necessary to equalize the photonic intensity of each data FRAME to the photonic intensity of the most attenuated time slot is available for each data frame as the data frame leaves the output of OTSI 30A along path 42A. On path 42A, the differences in photonic intensities of the re-ordered time slots 40 are the same as those at the output of OTSI 30 in FIG. 1.

A variable attenuator 60 is connected to the second end of path 42A to receive the re-ordered data FRAME 40. Variable attenuator 60 is adjustable from a minimum amount, i.e. minimum insertion loss, to almost complete shut off, i.e. an attenuation of infinite dB. The variable attenuator 60 can be adjusted rapidly enough to allow change for each individual time slot during the guard band portion of each time slot. A cable 62 connects variable attenuator 60 to the controller 38A. The information on the amount of attenuation needed for each time slot is carried from controller 38A to variable attenuator 60 via cable 62. The receiver/demodulator 50 responds well to the equalized intensity, even though the absolute intensity is lower.

Figure 3:
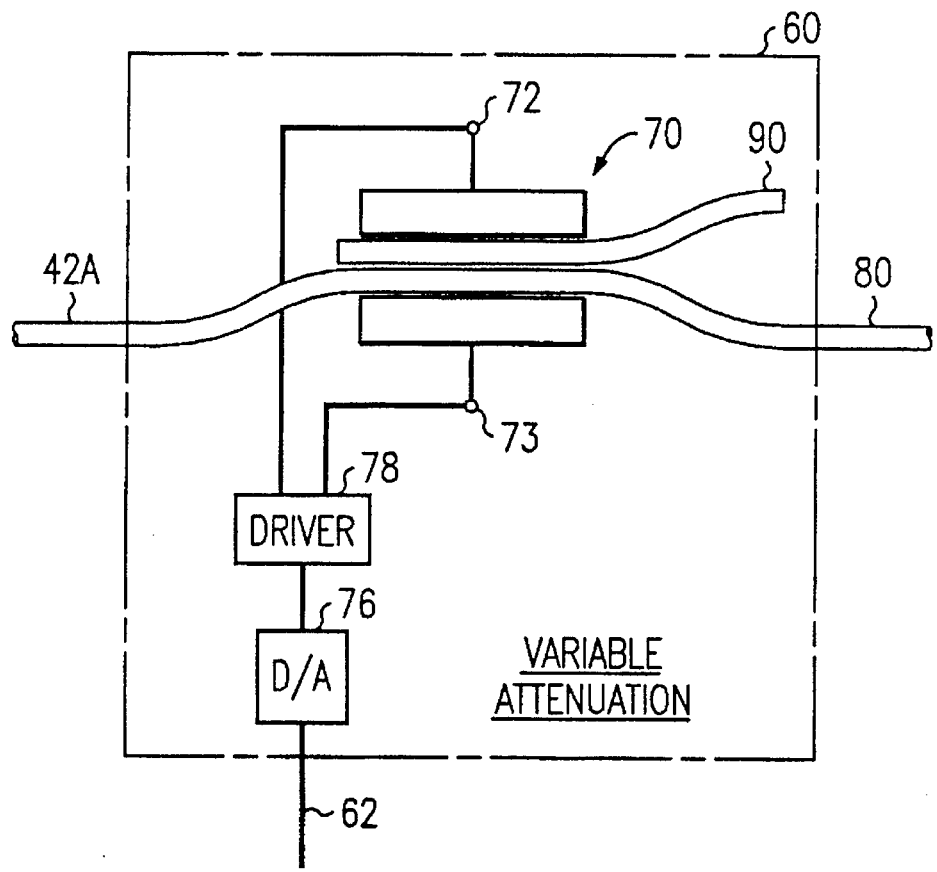
FIG. 3 is a pictorial representation of a 1×2 lithium niobate controllable attenuator.

Referring now to FIG. 3, one embodiment of variable attenuator 60 is shown. A 1X2 lithium niobate switch 70 is the operating element of the variable attenuator 60. Switch 70 has control terminals 72 and 73. Lithium niobate switches are usually used as single pole double throw switches that connect the single pole exclusively to one of two possible outputs according to two sets of drive voltages across terminals 72, 73. By selecting voltages in between the two drive voltages for exclusive connection to an output, non-exclusive 'switch' connections are obtained. In these non-exclusive connections, a portion of the photonic intensity of each time slot is conveyed by the main optical path to the output of the variable attenuator 70 and the remainder is absorbed or conveyed to oblivion via a dead-ended optical path 90 of the 1×2 switch 70. The amount of the photonic intensity that is absorbed or dead-ended is the amount of attenuation. The amount of attenuation for each drive voltage level is predetermined at time of manufacture or at the time of installation and used in the control circuits.

The 1×2 switch 70 also has a digital to analog converter 76 that is connected via cable 62 to controller 38A (shown in FIG. 2). Digital to analog converter is also connected to a medium voltage driver 78. Controller 38A sends a message to the digital to analog converter 76 with the attenuation required for the current time slot. Digital to analog converter 76 converts this message to an analog voltage, which is amplified by driver 78 to drive 1×2 switch 70 to the desired amount of attenuation for the current time slot. After being attenuated, the time slot leaves the variable attenuator 60 as frame 82 of uniform intensity and follows path 80 to receiver/demodulator 50 Those skilled in the art will recognize that the digital to analog converter 76 and the driver 78 could alternatively be located in the controller 38A, such a modification is deemed to be within the scope OF the present invention.

Figure 4:
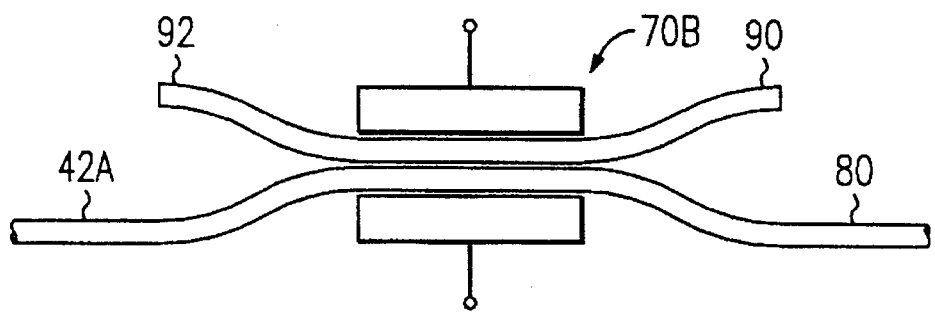
FIG. 4 is a pictorial representation of a 2×2 lithium niobate controllable attenuator.

Referring now to FIG. 4, a 2×2 lithium niobate switch 70B could be used instead of the 1×2 shown in FIG. 3. The difference would be that the 2×2 lithium niobate switch 70B has a dead-ended input 92 as well as a dead-ended output 90. Otherwise operation is essentially the same. This embodiment may be more attractive if 2×2 lithium niobate switches have better cost or performance characteristics than 1×2 because of wider use by industry.

Referring to FIGS. 2 and 3, in operation with the re-ordering of the slots of OTSI 30A stored in the controller 38A, the attenuation required to attenuate the photonic intensity of each time slot to the intensity of the most attenuated time slot is determined before that time slot reaches the variable attenuator 60. During the guard band between time slots, the variable attenuator 60 is set to provide the required attenuation to equalize the photonic intensity level of the current time slot with the photonic intensity level that the controller 38A determines will be the most attenuated of all of the time slots of the data frame 40. Thus, all the time slots of the data frame 82 are equalized to substantially the same level before the data frame reaches receiver demodulator 50, and the bit error rate of the demodulated data sent to data unit 52 greatly improved. Yet, each data FRAME is equalized to its own most attenuated photonic intensity level, which means that each time slot is only attenuated as much as necessary to equalize it with the photonic intensities of other time slots in its respective data frame and no fixed attenuations which needlessly waste signal-to-noise ratios of the time slots are used in the present invention. For example, if a data frame had no re-ordering as it passed through the OTSI 30A, all time slots would be sent by the same minimal path, attenuated the minimal amount by the OTSI 30A and the variable attenuator 60. In contrast, a system such as Koai's would necessarily have a preset attenuation to either the worst case or to some compromise case.

Thus, it will now be understood that there has been disclosed a new optical time slot interchanger system, which uses a variable attenuator to equalize the photonic intensities of the re-ordered time slots of data within a data frame. While the invention has been particularly illustrated and described with reference to preferred embodiments thereof, it will be understood by those skilled in the art that various changes in form, details, and applications may be made therein. For example, one or more optical amplifiers may be added into the optical paths to increase the optical intensity of each time slot before or after the variable attenuator operates to equalize the photonic intensifies of the slots. It is accordingly intended that the appended claims shall cover all such changes in form, details and applications which do not depart from the true spirit and scope of the invention.

What is claimed as new and desired to be secured by Letters Patent of the United States is:

1. An optical apparatus, comprising:

an optical switch having an output for delivering a frame of optical data, said optical data being divided among a plurality of time slots and said optical data in each of said plurality of time slots having a respective photonic intensity that is a function of an amount of delay to which the data is subjected;

a controllable optical attenuator, having an input and an output, having its input connected to said optical switch output for receiving delivery of said frame, said controllable optical attenuator being dynamically adjustable among a plurality of pre-selected amounts of attenuation; and means for controlling said controllable optical attenuator to attenuate a photonic intensity of said optical data within each time slot by a pre-selected amount of said plurality of pre-selected amounts of attenuation such that it is substantially the same as the photonic intensity of the optical data within the time slot of the frame having the lowest photonic intensity.

2. The apparatus as set forth in claim 1, wherein said optical switch is an optical time slot interchanger.

3. The apparatus as set forth in claim 2, further comprising an optical demodulator connected to said controllable optical attenuator output for demodulating said optical data into electrical data.

4. The apparatus of claim 1, wherein said controllable optical attenuator is a lithium niobate device.

5. An optical apparatus, comprising:

a combiner having a plurality of inputs and an output;

a first path for optical signals connected to a first input of said combiner for delivering a first photonic signal having a first intensity to said first input of said combiner at a first time period;

a second path for optical signals connected to a second input of said combiner switch for delivering a second photonic signal having a second intensity entering said second input of said combiner from said second path at a second time period that is adjacent to said first time period;

a third path for optical signals connected to said combiner output, said combiner combining the photonic signals from its inputs into a single train of optical signals which are carried by said third path;

an electrically controllable optical attenuator, having an input and an output, having its input connected to said third path to receive said single train of optical signals therefrom; and means for controlling said electrically controllable optical attenuator such that said first and second optical signal's intensity are attenuated by pre-selected amounts such that they are substantially the same;

wherein said controlling means includes:
a programmable processor that determines the amount that each optical signs is attenuated by its respective delay path, determines the optical signal that is attenuated the most by its delay path, and determines from pre-determined attenuation data of each delay path for each of the other optical signals an amount of attenuation to attenuate it to substantially the same intensity level as the most attenuated optical signal; and
means for converting each of said amounts of attenuation into a control voltage which controls said electrically controllable optical attenuator.

6. The apparatus of claim 5, wherein said electrically controllable optical attenuator is a lithium niobate device.

7. The apparatus as set forth in claim 5, wherein said electrically controllable optical attenuator is a 1×2 switch which switches a portion of the single train of optical signals from its input to its output and the rest of the single train of optical signals is lost, and the size of the portion that is conveyed from the input to the output is a function of a control voltage impressed across the switch control terminals of the 1×2 switch.

8. The apparatus as set forth in claim 5, wherein said electrically controllable optical attenuator is a 2×2 switch which switches a portion of the single train of optical signals from one of its inputs to its output and the rest of the single train of optical signals is lost, and the size of the portion that is conveyed from the input to the output is a function of a control voltage impressed across the switch control terminals of the 2×2 switch.

9. A method for adjusting a photonic intensity of each optical data slot of a plurality of optical data slots of an optical data frame, which is emitted from an optical time slot interchanger, to provide a frame of optical data with the photonic intensity of each slot having substantially the same intensity even where at least three of the photonic intensities of the slots emitted from the optical time slot interchanger are not of substantially the same intensity, comprising the steps of:
receiving the optical data frame having the plurality of optical data slots at an input of said optical time slot interchanger with each of said slots having substantially the same photonic intensity;
interchanging at least two positions of said plurality of optical data slots within said frame by delaying at least two slots and inserting them into said frame in later slot positions, the delaying being provided by delay paths, each of which also attenuates the photonic intensity of its respective delayed slot; and
dynamically attenuating all of the other photonic intensities of the plurality of optical data slots on a per slot basis by said pre-determined amount such that the photonic intensity of each of said slots is again substantially the same.

10. A method as set forth in claim 9, further comprising the step of demodulating said frame to convert the optical data into electrical data signals.

11. A method as set forth in claim 9, further comprising the step of amplifying said frame to provide a higher intensity for all slots of the frame while maintaining their substantially similar intensity levels.

12. A method as set forth in claim 11, further comprising the step of demodulating the frame to convert the optical data into electrical data signals.

* * * * *